United States Patent [19]
Deman et al.

[11] 4,187,404
[45] Feb. 5, 1980

[54] TELEPHONE SET FOR OPTICAL FIBERS LINES

[75] Inventors: Pierre Deman; Luigi d'Auria, both of Paris, France

[73] Assignee: Thomson-CSF, Paris, France

[21] Appl. No.: 926,234

[22] Filed: Jul. 20, 1978

[30] Foreign Application Priority Data

Jul. 25, 1977 [FR] France .................. 77 22757

[51] Int. Cl.² .................................... H04B 9/00
[52] U.S. Cl. ......................... 179/100 R; 250/199
[58] Field of Search ............. 179/100, 1 C, 2 C, 2 R; 250/199; 340/380

[56] References Cited

U.S. PATENT DOCUMENTS

| | | | |
|---|---|---|---|
| Re. 15,070 | 3/1921 | Willis | 179/81 R |
| 796,254 | 8/1905 | Hartmann | 250/199 |
| 2,599,368 | 6/1952 | Bruce et al. | 250/199 |
| 3,409,369 | 11/1968 | Bickel | 250/199 X |
| 3,891,940 | 6/1975 | Sekiguchi | 179/90 K |
| 4,088,885 | 5/1978 | Meslener | 250/199 |

*Primary Examiner*—Felix D. Gruber
*Assistant Examiner*—E. S. Kemeny
*Attorney, Agent, or Firm*—Cushman, Darby & Cushman

[57] ABSTRACT

A telephone set for optical fibers lines having a coupler for directing a first part of the light received from the input optical fiber on a photo-cell and a second part of this light on a microphone modulating this second part without electrical intermediate apparatus, the photo-cell feed alternately a bell or a receiver, and the light modulated by the microphone is directed via a dialling system on the output optical fiber.

7 Claims, 9 Drawing Figures

TELEPHONE SET FOR OPTICAL FIBERS LINES

BACKGROUND OF THE INVENTION

This invention relates to telephones for connecting by optical fibers a subscriber to a central station. This exchange may be for example an automatic exchange in the case of a subscriber of the public network or a tele-data installation for processing simple numerical data transmitted by means of the dialling unit of the telephone.

It is known how to produce optical fibers capable of transmitting modulated luminous signals over relatively long distances with minimal attenuation. By accepting a band-width which, although relatively reduced, is nevertheless very much greater than that (3100 Hz) required for a standard telephone, it is possible to use fibers of greatly reduced cost enabling a connection of several km to be established.

However, the telephone line connecting the subscriber's set to the exchange is also used for transmitting the direct current used for feeding the set, because regulations prohibit the use of mains supply and because, it would be unthinkable to return to the system of the local battery with its limitations attributable to the wear of cells. In any case, this feed current could not be conducted by the optical fibers.

SUMMARY OF THE INVENTION

The object of the present invention is to eliminate the need for any external electrical supply, whether local or remote, in a telephone for connection by optical fibers by making the telephone set operate solely on the basis of the luminous energy delivered thereto by the fibers connecting the telephone set with the exchange.

To this end, the receiver and the bell are fed from a photovoltaic cell and a microphone and optomechanical dialling elements are used.

In accordance with the present invention, there is provided a telephone set for receiving from an input optical fiber an input optical signal and for emitting on at least on an output optical fiber an output optical signal, which comprises:

a two channel coupler for dividing said input optical signal into a first and a second parts;

a photo-electric cell for converting said first part in an electrical signal;

a receiver actuated by said electrical signal;

a microphone for first modulating said second part and delivering said output optical signal.

BRIEF DESCRIPTION OF THE DRAWINGS

For a better understanding of the invention, and to show how the same may be carried into effect, reference will be made to the ensuing description and to the attached figures among which.

DETAILED DESCRIPTION

Figure 1:
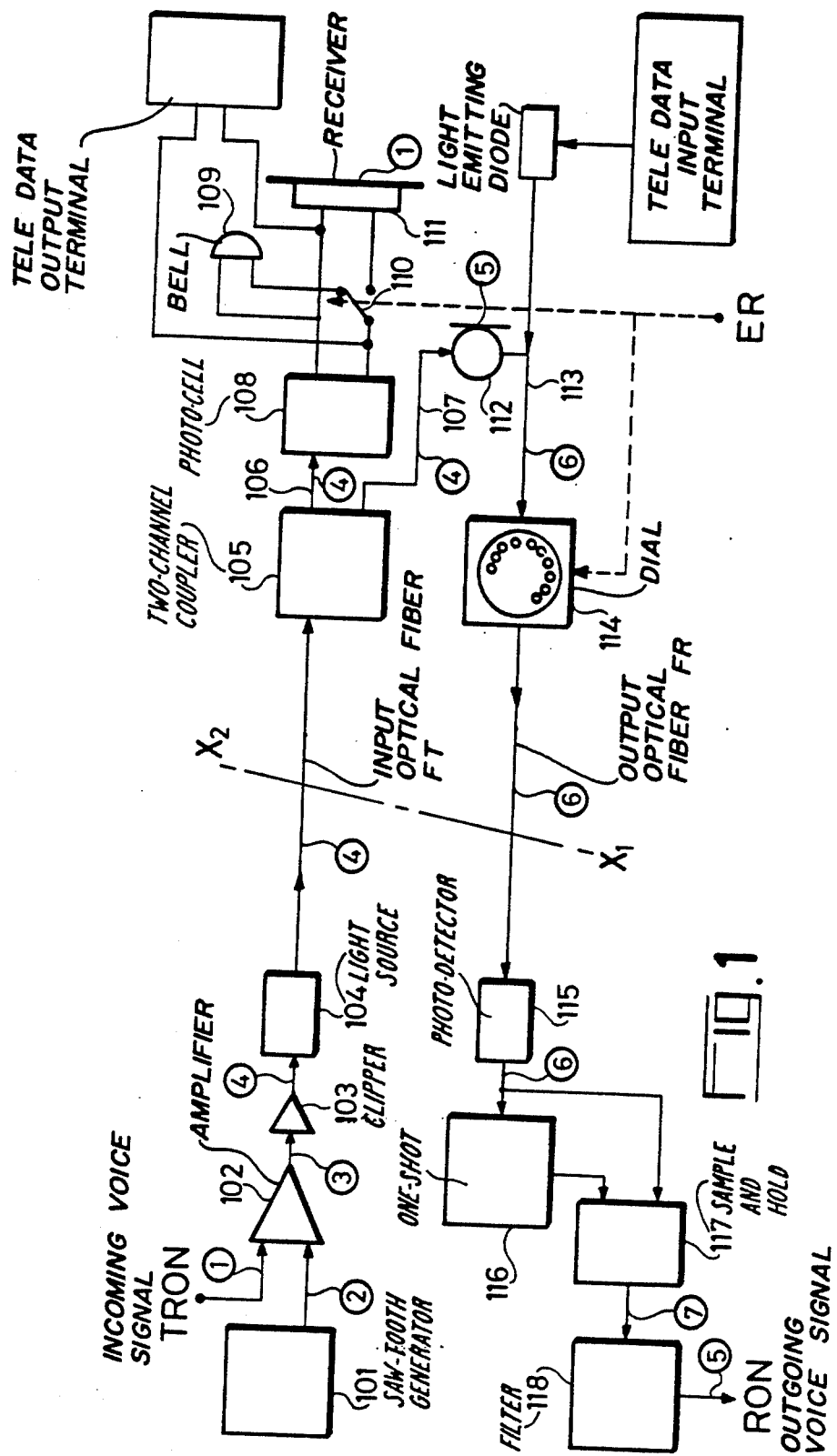
FIG. 1 illustrates an optical connection using a telephone set.

FIG. 1 shows on the right of a separation axis $X_1 X_2$ the essential elements of a telephone set according to the invention and, on the left of that axis, matching elements situated in the exchange and connected to the set by the optical fibers FT and FR. These matching elements are described purely by way of illustration and their construction may differ considerably according to the automatic exchange used.

Figure 2:
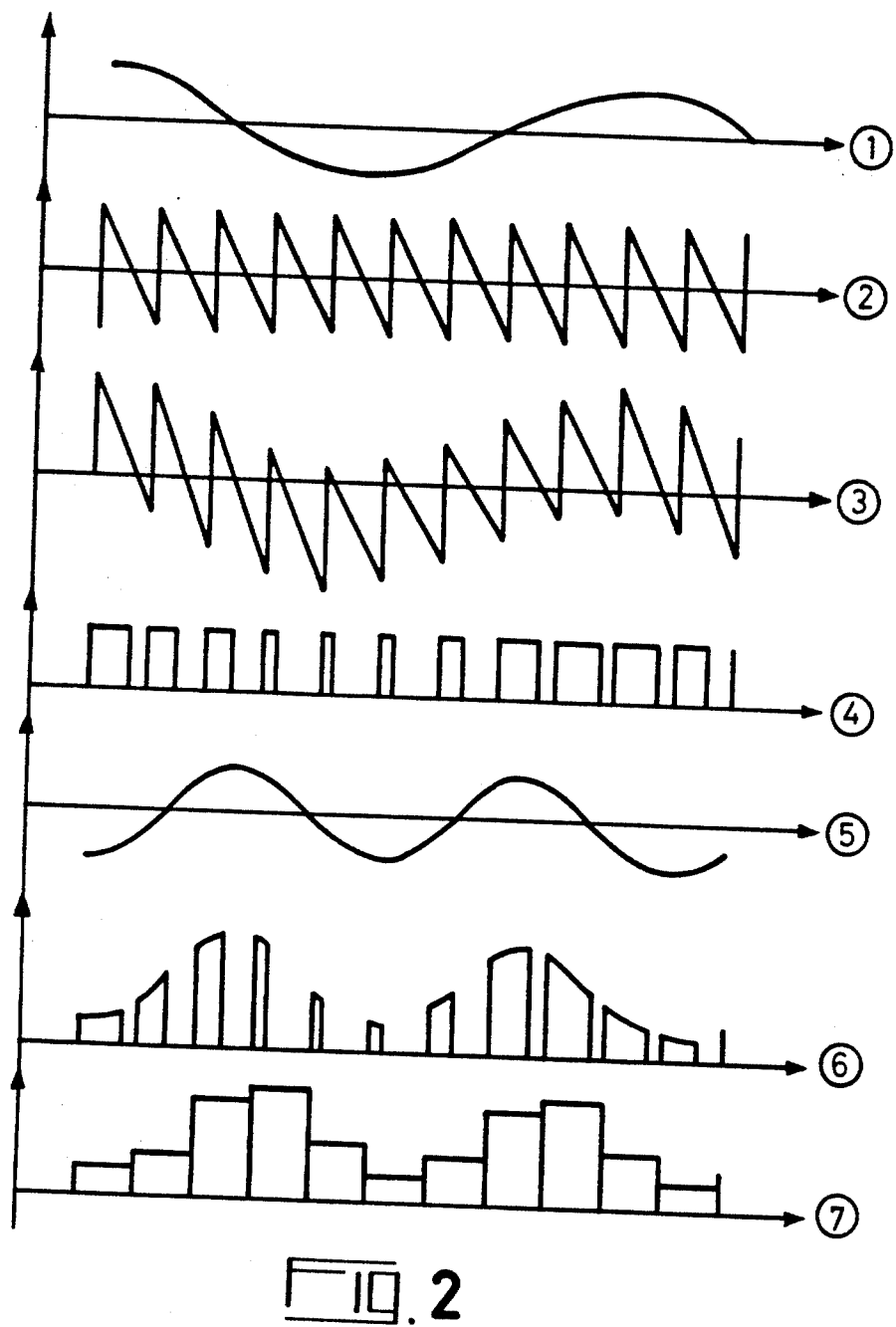
FIG. 2 illustrates a diagram of the signals along this connection.

The voice signal to be transmitted to the subscriber arrives on the line TRON. In an amplifier 102, it is superimposed upon a sawtooth signal supplied by the generator 101. The corresponding signals 1, 2, and 3 and those described hereinafter are shown in FIG. 2 with, as reference, a number in a circle which corresponds to the same reference in FIG. 1. The composite signal issuing from the amplifier 102 is clipped in a clipper 103 which delivers a succession of pulses modulated in duration 4. The modulation thus described is known by the name of PDM. The repetition frequency of the pulses will be for example 16 kHz in order to avoid any problem of spectrum overlap.

The output of the amplifier 103 is applied to a light source 104 capable of exciting the optical fiber FT.

It is possible for example to use a semiconductor laser which is a particularly well-suited device because, on account of the narrow band width required, the fiber may be large in diameter (several hundreds of $\mu m$) and may correspond without any particular problem of matching to the emitting surface of such a laser.

The optical fiber FT is connected in the telephone set to a two-channel coupler 105 which enables the luminous signal to be divided into two parts for attacking the two outgoing fibers 106 and 107. A coupler of this type is known in the art and may be produced for example in the form of a variant of the device described in Applicants copending application Ser. No. 779,094 filed on Mar. 18, 1977 which is incorporated by reference.

The fiber 106 excites a photovoltaic cell 108 which, at its output terminals, delivers an electrical voltage representing the signal 4 apart from an attenuation factor. A photovoltaic cell of the type in question may be formed by an ordinary silicon photodiode.

When the hand set is in its rest position, the cell 108 feeds the bell 109 through the switch 110. The power supplied by an optical system such as this is inadequate for actuating an ordinary bell set, so that a device which accumulates the energy and actuates a bell at regular intervals or any other device adapted to this low level is used.

When the hand set is lifted, switch 110 is operated by a mechanical control symbolised by the arrow ER, interrupting the supply of energy to the bell and connecting the receiver 111 to the terminals of the cell 108.

The electrical power supplied by the cell 108 is entirely adequate for actuating this receiver which reproduces the voice signal transmitted. This is because, as already known, a PDM signal may be demodulated by being subjected to low-pass filtering, for which purpose it is possible to use the inertia of the diaphragm of the receiver which is too great for reproducing the pulses of the signal 4 and leads to a smoothing of that signal which thus gives the signal 1. If the receiver in question is too highly rated in its performance characteristics and renders the sampling noise audible, a low-pass filter may be introduced between the cell and the receiver.

The fiber 107 leads to the microphone 112 which is of the acoustooptical type and enables the luminous signal present in this fiber to be directly modulated. The sound signal applied to the microphone is for example like the signal 5. The luminous signal issuing from the microphone on the optical fiber 113 will thus be like the signal 6, i.e. a PDM signal comprising an additional amplitude modulation.

The fiber 113 is connected to the dialling unit 114 which comprises for example a mechanical dial of ordinary type provided on its shaft with a rotary optical switch which enables an optical connection between the fiber 113 and the fiber FR transmitting to the exchange to be interrupted at regular intervals. It is thus possible to transmit dialling pulses. The dialling unit 114 also receives the mechanical control ER which enables the optical switch to be blocked when the hand set is replaced, thereby interrupting the connection between the fibers 113 and FR which guarantees the privacy of the conversations taking place through the telephone when the hand set is lifted.

In the exchange, the fiber FR leads to a photoelectric detector 115. This detector comprises a photoelectric cell which enables the luminous signal transmitted by the fiber FR to be converted into an electrical signal. This cell may be connected in the usual way with a polarization because there is no problem of energy supply in the exchange.

The signal 6 which appears at the output of the detector 116 has to be demodulated in order to separate the modulation 5 from the modulation 1 which is always present there. To this end, it is possible for example to release a monostable circuit 116 with the leading edge of the pulses of the signal 6. This is because the position of this edge is constant and bears the amplitude modulation reproducing the signal 5. For a period which is brief by comparison with the minimal duration of the pulses, this monostable circuit opens a sample-and-hold circuit 117 which itself also receives the signal 6 and memorises the height of the leading edge of each of the pulses of the signal 6. At its output, this circuit 117 delivers a stepped signal 7 which represents the sampled signal with a continuous component. For obtaining the signal 5, it is sufficient to pass this signal 7 through a band-pass filter 118, for example a standard 300-3400 Hz telephone filter, which eliminates the continuous component by its low-cut characteristics and the sampling effect by its high-cut characteristics. The voice signal 5 is thus obtained at the output connection RON.

Figure 3:
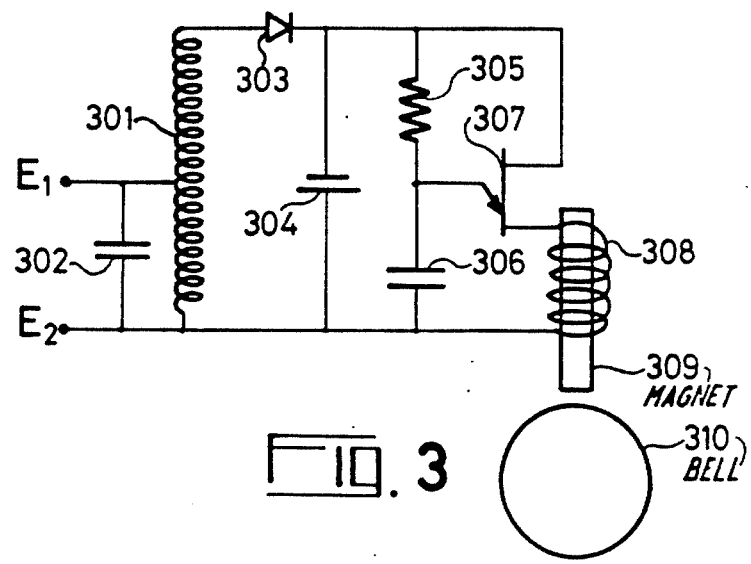
FIG. 3 illustrates a circuit diagram of a bell set.

In the example of embodiment of the bell set 109 shown in FIG. 3, the signal delivered by the cell 108 arrives at the input terminals $E_1$ and $E_2$. These terminals are connected to the low-voltage part of a step-up autotransformer 301. This low-voltage part is tuned to the repetition frequency of the pulses present at the input $E_1$-$E_2$ by means of a capacitor 302. This voltage supplied by the cell 108 thus charged may be of the order of a few tenths of a volt and the autotransformer 301 enables it to be converted into a voltage of the order of 10 volts. A diode 303 enables the voltage supplied by the high-voltage part of the autotransformer to be rectified and a capacitor 304 to be charged. A circuit consisting of a resistor 305, a capacitor 306 and a unijunction transistor 307 connected in known manner to operate as a relaxation oscillator enables the capacitor 304 to be discharged at regular intervals into a solenoid 308 connected in series with one of the bases of the transistor 307. The strong current which then passes into this solenoid projects a magnetised bar 309 onto a bell 310 which resonates under the impact. A return spring (not shown) enables the bar 309 to be withdrawn rearwards.

Figure 4:
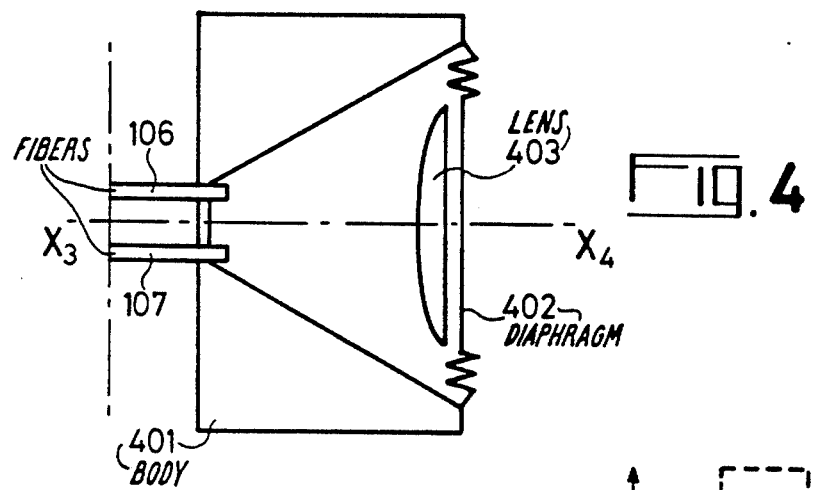
FIG. 4 illustrates a circuit diagram of a microphone.

The opto-acoustic microphone shown in FIG. 4 is substantially a body of revolution about an axis $X_3$-$X_4$ and comprises a body 401 formed with a cavity closed at its front end by a diaphragm 402 comprising a flat central surface and a flexible folded edge facilitating its deflection under the action of the sound vibrations. The fiber 106 through which the light signals to be modulated by the sound signal arrives is fixed to the rear of the body 401 slightly eccentrically relative to the axis $X_3$-$X_4$. It emits a luminous beam which is taken up by a lens 403, subsequently reflected by the rear polished surface of the diaphragm 402 and then passes back through the lens 403 by which it is substantially focussed on the entry face of the fiber 107 which delivers the luminous signals modulated by the sound vibrations acting on the diaphragm 403. The fiber 107 is also fixed to the rear of the body 401 slightly eccentrically relative to the axis $X_3$-$X_4$. The respective positions of the exit face of the fiber 106 and the entry face of the fiber 107 are such that the image of the exit face given by the catadioptric system formed by the lens 403 and the diaphragm 402 is formed just in front of or behind the entry face. The reason for this is that, if this image were to be formed on this entry face itself, any movement of the diaphragm either forwards or backwards would produce a reduction in the amount of light transmitted from the fiber 106 to the fiber 107 and the modulation thus produced would correspond to a doubling of all the sound frequencies to be transmitted. On the other hand, by shifting the image relative to the entry face, the amount of light transferred in the rest position is reduced, for example by half, and the movement in one direction of the diaphragm will tend to bring the image closer to the entry face by increasing the amount of light transmitted. Conversely, the movement of the diaphragm in the other direction will tend to reduce the quantity of light transmitted. Thus, the modulation will indeed reproduce the sound signal to be transmitted.

It is known that conventional dials comprise a shaft which rotates at a constant speed during a number of revolutions determined by the number of dialling pulses to be transmitted. This shaft drives a cam which opens a contact set twice per revolution which causes two pulses to be transmitted for each revolution of the shaft.

Figure 5:
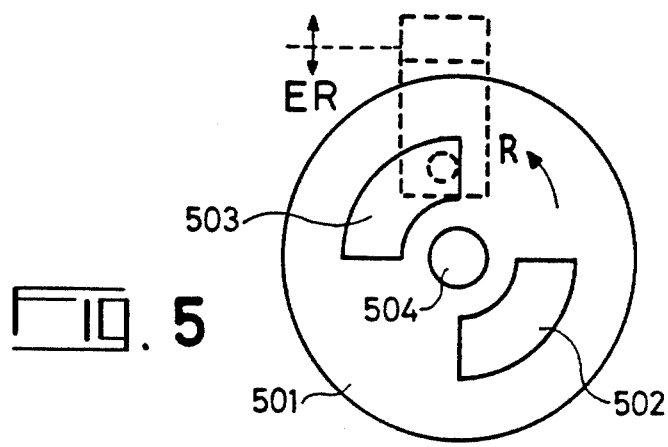
FIGS. 5 and 6 illustrate a rotary dialling switch.
Figure 6:
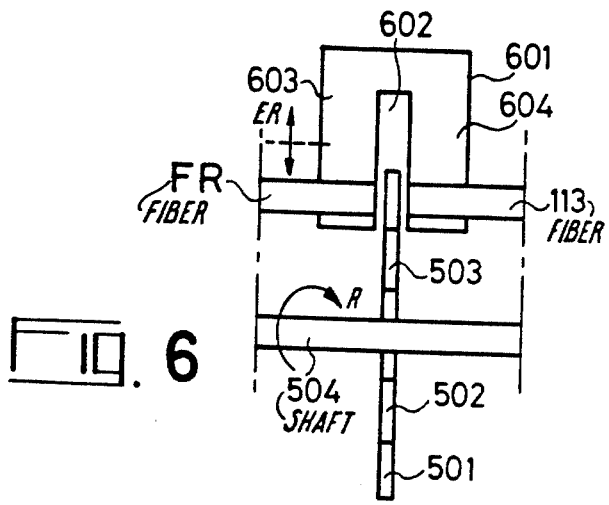

One embodiment of the dialling unit 104 consists for example in fixing to the shaft of a mechanism of the above type a rotating shutter such as that shown in FIGS. 5 and 6. This shutter consists of a disc 501 comprising two apertures 502 and 503 in the form of long sectors of a quarter circle situated diametrically opposite one another. This disc is fixed at its center to the rotating shaft 504 of the dialling mechanism. A stirrup 601 comprising a slot 602 and two arms 603 and 604 shown in dotted lines in FIG. 5 and in solid lines in the sectional view of FIG. 6 straddles the disc 501. The fibers 113 and FR are fixed to the two arms of this stirrup which they cross from one side to the other, terminating opposite one another in the slot 602.

A mechanism (not shown) enables the stirrup 601 to be vertically moved under the effect of the mechanical control ER. In the upper position, corresponding to FIG. 6, the optical path between the fibers 113 and FR is blocked by the outer rim of the disc 501. In the lower position, corresponding to FIG. 5, the luminous signals can pass between these two fibers, traversing the slot 602 and the sector 503, the disc 501 being keyed to the shaft 504 in such a way that, in the rest position of the drive mechanism of this shaft, the optical path between the fibers 113 and FR passes to the edge of one of the ends of the sector 501.

Thus, when the hand set is lifted, the stirrup 601 passes from the upper position to the lower position, establishing communication with the exchange. On receiving the tone, the operator manipulates the dial. Under the effect of this manipulation, the disc 501 rotates in the direction of the arrow R and rhythmically interrupts the optical connection between the fibers 113 and FR which causes a series of pulses to be received at the exchange, enabling the exchange to locate the required connection. Since the duration of these pulses is of the order of several tens of milliseconds under current standards, they cannot interfer at the exchange with the modulation pulses 6 (FIG. 2) of which the duration is of the order of a few tens of microseconds.

When the hand set is replaced, the stirrup 601 returns to its upper position, breaking the communication.

The state of the line between the telephone set and the exchange may be monitored by using for the disc 501 a slightly transparent material which allows a small portion of the luminous energy to pass through when the stirrup is in its upper position. In that case, the various levels will be regulated in such a way as to obtain for example a signal-to-noise ratio of the order of 1 for the signal 6 at the level of the exchange which completely prevents the demodulated signal 5 of 6 from being rendered intelligible. On the other hand, it is known that it is easy, for example by an autocorrelation technique, to detect pulses having a known repetition frequency in a high-noise signal so that by detecting the absence or presence of 4 in 6, it is possible to test the continuity of the line.

Another embodiment of the disc 501 for ensuring this monitoring function consists in forming a small hole in the outer rim of the disc at a point situated between the fibers 113 and FR for the upper position of the stirrup 601. This hole enables precisely the quantity of light required for obtaining the desired signal-to-noise ratio to pass through.

Numerical data may be transmitted by means of a dial, although this is a fastidious operation. It is much easier to use a dialling keyboard which also makes it easier to call the number of the subscriber to be connected.

Figure 7:
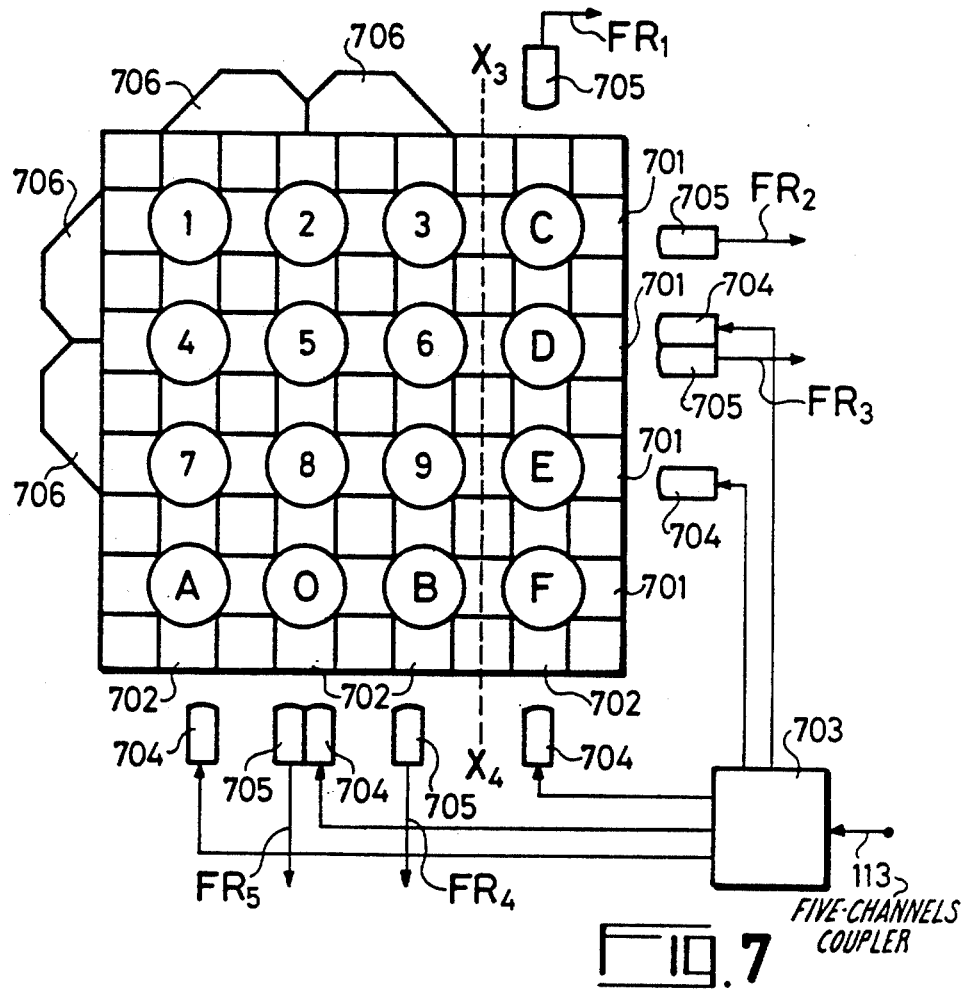
FIG. 7 illustrates a dialling keyboard.

A keyboard such as this is shown in its standard 16-key form in FIG. 7. A 12-key version corresponds to the part situated to the left of the dotted line $X_3$–$X_4$.

This keyboard comprises horizontal channels 701 and vertical channels 702 intersecting at the locations of the keys 0 to 9 and A to F. The keys enable these channels to be occulted.

The optical fiber 113 leads to a multiple coupler 703 similar to the coupler 105 (FIG. 1) and provided with five outgoing fibers which respectively lead to five emitting lenses 704 which emit the light emanating from the fiber 103 in certain of the channels 701 and 702.

This light leads to receiving lenses 705 after having passed either through a single channel or through two channels.

In the latter case, the light issuing from the channel attacked by an emitting lens is taken up by one of the prisms 706 and re-emitted in the adjacent channel from which it issues to impinge on a receiving lens.

These receiving lenses 705 enable the light transmitted to be injected respectively into the optical fibers $FR_1$ to $FR_5$. Accordingly, these optical fibers transmit in parallel the same luminous signal as the single fiber FR of FIG. 1. At the exchange, each of these fibers excites a receiving cell, such as 115, so that five identical, but separate, electrical signals are obtained. An adder then enables the signal 6 to be obtained from these five signals.

By depressing the keys of the keyboard, transmission is interrupted along certain of the fibers $FR_i$ so that, by separately processing the five electrical signals induced in the photoelectric receivers excited by these fibers, it is possible to reconstitute a dialling signal to the desired standards, for example of the frequency combination type. A logic device comprising for example a combination of gates may be used for this purpose. It can clearly be seen from FIG. 7 that the device shown enables a separate combination of transmission states of the fibers $FR_i$ to be obtained for each of the keys of the keyboard. The same result is also obtained for a keyboard reduced to 12 keys.

Figure 8:
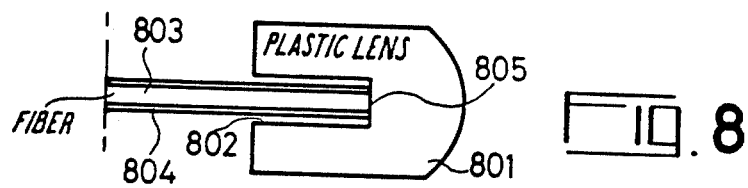
FIG. 8 illustrates a coupling lens for this keyboard.

The lens shown in FIG. 8 is one example of embodiment both of the lenses 704 and of the lenses 705.

This lens consists of a block 801 of transparent material, for example a plastic, which forms a spherical lens. A cavity 802 formed in the flat face of this lens enables it to receive an optical fiber comprising for example a core 803 and a cladding 804. This cladding makes it possible inter alia to avoid any undesirable coupling of the lateral surface of the fiber with the lateral walls of the cavity 802. The end 805 of the fiber is connected to the base of the cavity 802 by means of a transparent adhesive having a refractive index similar to that of the fiber, for example of the cyano-acrylate type. The base of the cavity is situated near the focal point of the diopter so that the light issuing from the diopter forms a substantially convergent beam which will form the image of the end 805 on the entry face of the receiving diopter forming the lens. This receiving diopter will focus the light thus transmitted on the end of the transmitting fiber connected thereto.

Figure 9:
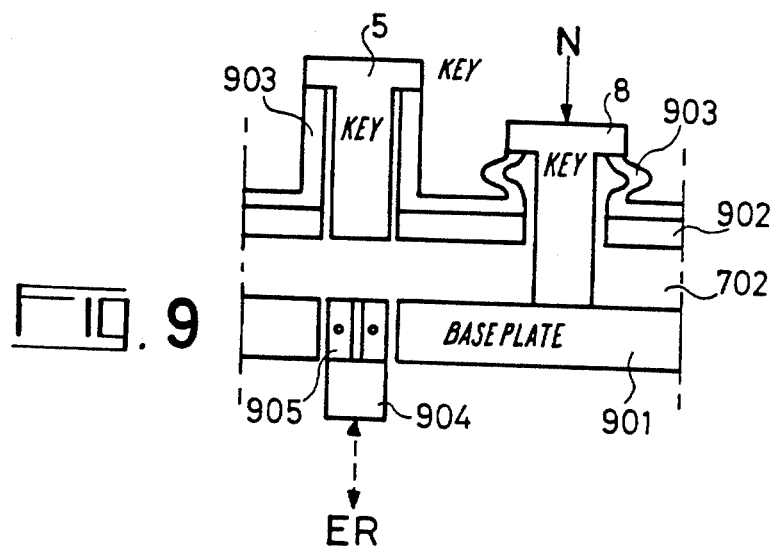
FIG. 9 illustrates a section through two keys of this keyboard.

FIG. 9 shows part of the keyboard of FIG. 7 in the form of a section taken along the channel 702 passing through the keys 5 and 8. The channel 702 is cut into a baseplate 901. This plate supports a cover 902 drilled with holes where the keys 5 and 8 slide. A layer of a flexible and elastic material, for example rubber, covers the cover 902, closes all the holes and forms supporting tubes 903 to the end of which are fixed the heads of the keys widened out into a mushroom-like form. These supporting tubes 903 thus hold the keys in their upper position, allowing the light to pass through (key 5 in the FIG.). The application of pressure to a key (arrow N on the key 8 in the FIG.) depresses the key which deforms the corresponding supporting tube, closing the channel 702 and the channel 701 which passes to this point and is perpendicular thereto. When the key is released, it returns to its upper position under the action of its supporting tube which forms a spring.

In order to ensure that the connection is broken when the hand set is replaced, holes are drilled below certain keys and contain shutters which, operated by the mechanical control ER, enable a sufficient number of channels 701 and 702 to be closed. A shutter of the type in question comprises for example a cylindrical base 904 surmounted by a crosshead 905 formed by two perpendicular plates which each close one passage. In order to monitor the continuity of the line, small holes may be drilled in these crossheads, as in the FIG., or the crossheads may be made of a slightly transparent material. It can be seen from FIG. 7 that it is sufficient to have one shutter below the key 5 and one shutter below the key F for the 16-key keyboard. For the 12-key keyboard, only the shutter below the key 5 is necessary.

Accordingly, the telephone set thus described does not require local power supply. It may comprise an input and/or an output for the use of other apparatus, such as a teledata terminal for example. In this case, where the terminal requires local power supply, the input in question may be equipped with a light-emitting diode for exciting the output fiber(s) through a multichannel coupler. Although this diode will not be supplied with power from the exchange, the telephone per se may always be used, even in the event of local power failures, as required by regulations. The available band width, even with any type of optical fiber, is sufficient for receiving and/or transmitting television signals converted to a frequency above the telephone band, which enables videophone connections to be established under perfectly normal economic conditions.

The optical power required for exciting the fiber FT is equal to that required for attacking the microphone 111 and to that required for the detector 115 to have a good signal to-noise ratio.

Taking the common value $\eta = 0.4$ A/W as the output of the photovoltaic cell 108 and using a microphone current requiring 0.7 V for 600 ohms, the optical power required for the fiber 106 is substantially 3 mW.

Given an optical power of 10 μm at the input end of the detector 115 and losses in the dialling unit and in the microphone each equal to 3 dB, with losses along the line FR equal to 10 dB, all common values, the optical power required for the fiber 107 is substantially 0.4 mW.

The coupler 105 currently reaches insertion losses of the order of 1 dB and the losses along the line FT will be of the same order as the losses along the line FR, i.e., 10 dB. The optical power at the input end of the coupler 105 will therefore amount substantially to 4.3 mW and at the output end of the source 104 to 43 mW.

A power of this order may be delivered for example by a semiconductor laser having a wide emissive zone. At present a laser of this type having an emissive zone of from 50 to 100 μm emits a power of approximately 1 mW per μm of emissive zone width.

It has been seen that it would be possible to use a relatively large optical fiber in excess of 100 μm in diameter which will therefore be readily excited by a laser of the type in question. At the present time, a fiber of this type has an attenuation of approximately 5 dB/km which enables the greatest number of local connections to be established without a repeater.

What we claim is:

1. A telephone set for receiving from an input optical fiber an input optical signal and for emitting on an output optical fiber an output optical signal comprising:
   a two-channel coupler for dividing said input optical signal into first and a second parts;
   a photovoltaic cell for converting said first part in an electrical signal;
   a receiver actuated by said electrical signal;
   a microphone diaphragm for receiving and directly modulating with acoustic waves said second part and delivering said output optical signal.

2. A telephone set according to claim 1, further comprising a bell system actuated by said electrical signal said bell system including a capacitor coupled to said electrical signal for storing charges from said electrical system, a trigger circuit coupled to said capacitor for periodically discharging said capacitor to develop a bell-ring signal, and a bell coupled to said bell ring signal, said telephone set further including first switch for alternatively connecting said receiver and said bell to said photo-electric cell.

3. A telephone set according to claim 2 further including a rotary shutter for periodically interrupting the emission of said output optical signal; each interruption corresponding to a dialling pulse.

4. A telephone set according to claim 2 wherein said output optical signal is emitted onto a plurality of output optical fibers and siad telephone set further includes a keyboard having a plurality of channels for simultaneously receiving from said microphone and propagating said second part of the input optical signal, a plurality of keys for closing said channels, and means for coupling said plurality of channels to said plurality of output optical fibers; each of said keys closing simultaneously at least two channels for determining a combination of closed channels related to said key.

5. A telephone set according to claim 2 further comprising means for partially interrupting the emission of said output optical signal when said bell is connected to said photo-electric cell; the level of said emission being reduced to a value allowing to monitor the continuity of said input and output optical fiber without demodulating said second part.

6. A telephone set according to claim 2 further comprising a wide-band output terminal connected to said photo-cell.

7. A telephone set according to claim 2 further comprising photo-emitting means for delivering onto said output optical fiber an additional optical signal and a wide-band input terminal connected to said photo-emitting means.

* * * * *